United States Patent [19]

Ellis

[11] Patent Number: 5,792,394
[45] Date of Patent: Aug. 11, 1998

[54] ANIMAL PEN SLAT REPAIR METHOD

[76] Inventor: Billy D. Ellis, P.O. Box 531, Farmington, Ark. 72730

[21] Appl. No.: 704,888

[22] Filed: Aug. 30, 1996

[51] Int. Cl.⁶ ..................................................... B28B 1/00
[52] U.S. Cl. ............................... 264/36; 249/28; 249/50; 249/172
[58] Field of Search ................................. 264/36; 249/28, 249/50, 172

[56] References Cited

U.S. PATENT DOCUMENTS

| 710,391 | 9/1902 | Haws | 249/172 |
| 974,372 | 11/1910 | Fullenkamp | 249/172 |
| 3,469,816 | 9/1969 | Blough et al. | 249/28 |
| 3,656,729 | 4/1972 | Borger | 249/172 |
| 4,842,241 | 6/1989 | Fitzgerald | 249/172 |

OTHER PUBLICATIONS

Murphy, James P.; Converting Farrowing to Grow–Finish Facility; National Hog Farmer, May 15, 1996, p. 60.

*Primary Examiner*—James Derrington
*Attorney, Agent, or Firm*—Robert R. Keegan; Head, Johnson & Kashigian

[57] ABSTRACT

There is disclosed concrete form apparatus comprising three elongated panels with sides hingedly connected and a method of using such apparatus to enable one to repair reinforced concrete slats in the floor of an animal pen by breaking away the concrete of a damaged slat while leaving any reinforcing bars within such slat and arranging the foldable three-part form apparatus to create a trapezoidal concrete form into which one pours a concrete mix and allows it to become firmly self-supporting before removing the form by lowering it to an unfolded position and drawing it up between two slat positions. In the event one wishes to proceed to replace most or all of the slats of an animal pen floor slab, it is accomplished by breaking out and reforming alternate ones of said slats in a first forming and pouring operation and subsequently, after those slats have become firm, performing the same procedure on the remaining set of alternate slats.

15 Claims, 2 Drawing Sheets

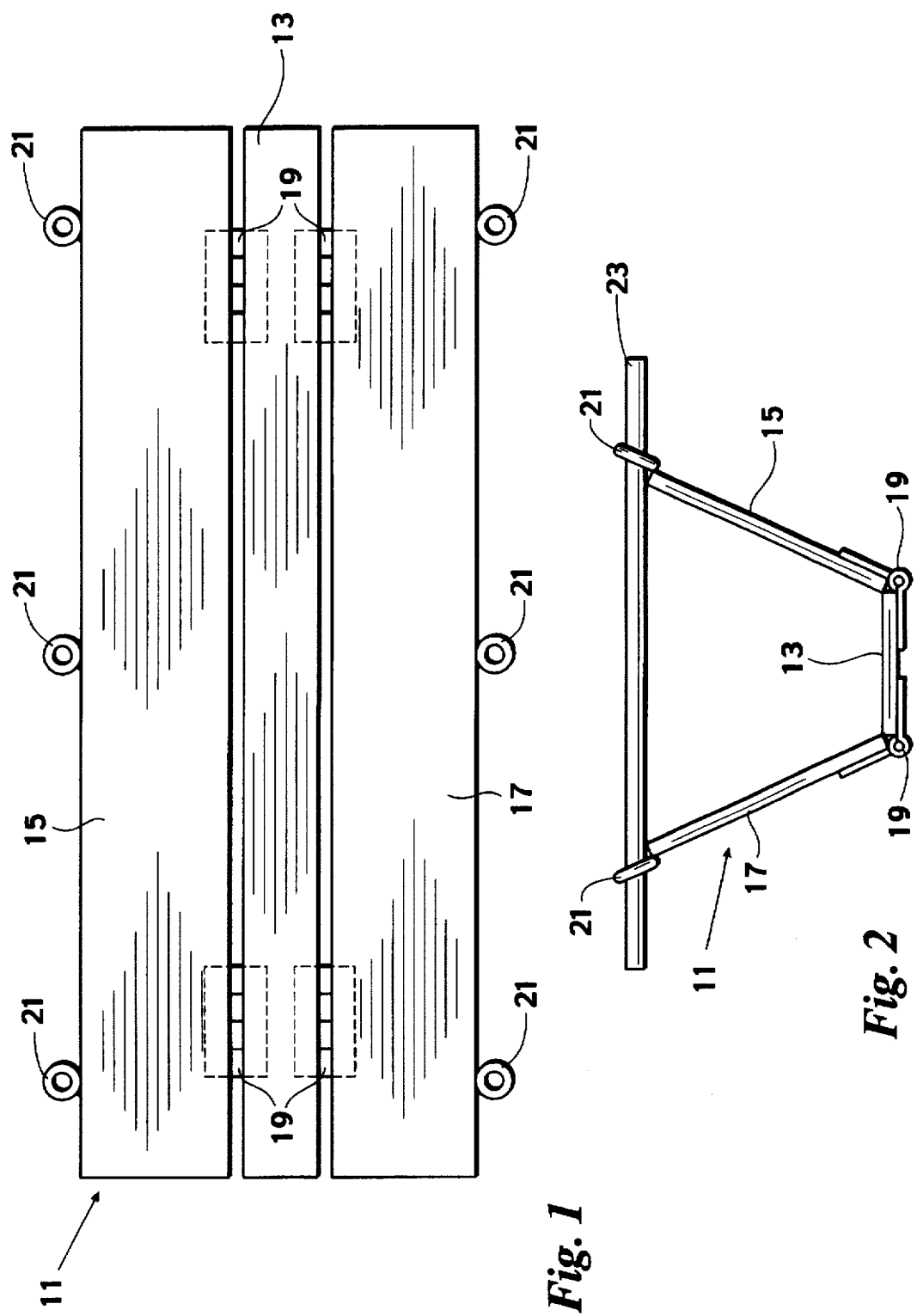

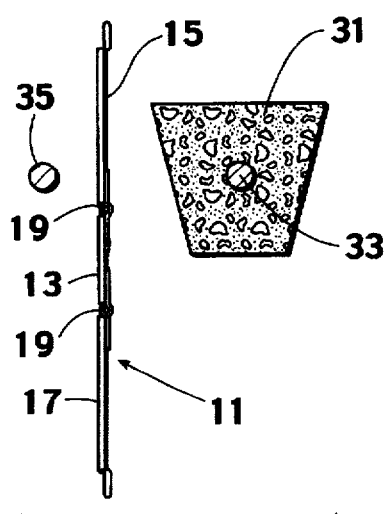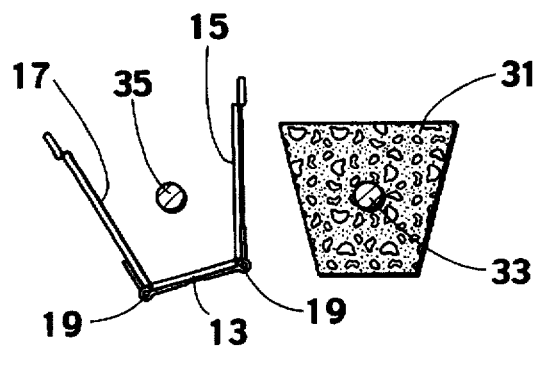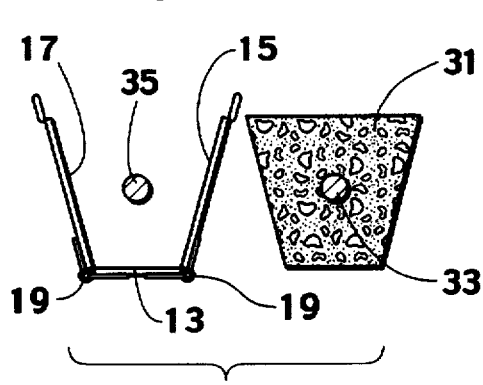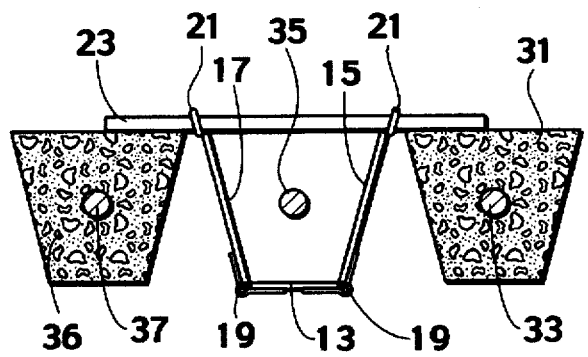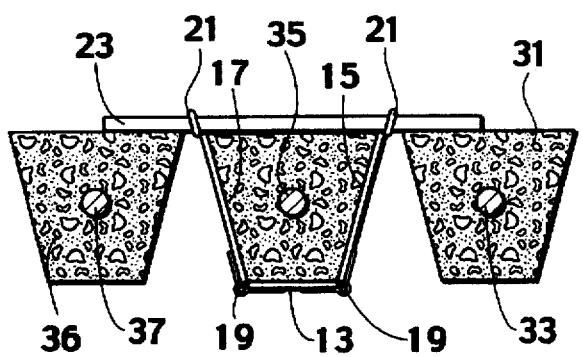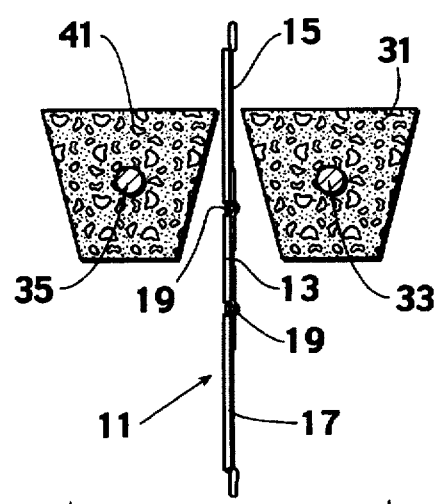

ANIMAL PEN SLAT REPAIR METHOD

SUMMARY OF THE INVENTION

The present invention relates to the repair or reconstruction of animal pens for livestock, and, most particularly, hogs raised and fattened for meat production. A common and effective way of confining such animals employs pens which may or may not be covered and are preferably of a relative small size, not exceeding ten feet by forty feet. In order to facilitate the maintenance of acceptably sanitary conditions in such pens, a pen construction has been devised in which the floor of the pen is not solid but consists of parallel vertical slats formed of reinforced concrete. The slats forming the floor may be six inches deep thereby giving the floor a thickness of about six inches and the spaces between the slats are dimensioned to be wide enough to allow liquid and solid waste to pass through to a collection chamber while being narrow enough to avoid entrapping the feet of the animals; dimensions of one-half inch to one inch have been found to be appropriate for the spacing forming the slots between slats. The width of the slats may be from four to eight inches. An important characteristic of most such floor structures is that, while the spacing between the slats is about an inch or less at the top surface, the slats are of trapezoidal cross-section and the spacing between the slats on the under surface is substantially greater than at the top surface. This has been found to be nearly essential in providing an avenue for the escape of solid waste which would not clog up and become ineffective.

While the effectiveness of hog enclosure pens with such floors has been demonstrated, they suffer from a short service life. The chemical environment created by the waste products is detrimental to the concrete material and any portion of the concrete which is weakened by chemical attack tends to be broken away by the stress produced by the feet of the heavy animals. Once breakage of the concrete along the slots occurs at the top surface, the slots no longer have the tapered opening to the bottom and solid waste becomes packed in the slots rather than passing through the slots to the chamber under the floor. Solid waste packed in the slots accelerates the deterioration further and creates a sanitation problem. Furthermore, deterioration and breakage of the slats eventually opens the space between the slats so that the foot and leg of the animal can be caught in the opening resulting in disabling injury to the animal which must then be removed and disposed of.

The standard procedure for repairing and replacing hog pen floors in the past has been to simply lift the entire floor slab out with heavy equipment and replace it with a new floor slab. Since a substantial cost of the pen is the floor slabs themselves, this is an expensive procedure for correcting the problem of deteriorating slats in the floor slabs.

According to the present invention, a method and apparatus is provided whereby the slats of floor slabs of hog pens can be repaired on site in an effective manner to provide as good as or better than original floor slab effectiveness and durability.

Briefly the method of the invention involves breaking out one or more floor slabs except for the end portions of the slab where they join the outer portion of the floor structure, preferably leaving in place one or more steel reinforcing bars that are present in each slat. Apparatus according to the invention is then used to provide a form for pouring a replacement concrete floor slab in place around the existing steel reinforcing bar. The form utilized is typically formed of three steel or stainless steel elongated panels, the center panel being approximately the width of the slab at its bottom surface, while the two outer panels are of equal width generally corresponding to the slant height of the sides of the floor slab.

The two outer panels are joined to the center panel in a flexible joint formed of conventional hinges or by other suitable means. While it is not necessary for the joint between the panels to be completely liquid tight, the joint may be covered with adhesive backed tape to provide a better seal if desired.

Since the form has flexible joints between the panels, it can be suspended in a flat position and lowered between a reinforcing bar and an adjacent slat until the topmost hinged joint is below the reinforcing bar. In this position, the lower edge of the lower-most panel can be drawn up, using a tool if desired, so that the form is folded to assume the shape of the cross section of the slat to be replaced. When properly positioned, it is ready to receive the poured concrete which will form the replacement slab. It is convenient for rings to be provided on the outer edges of the outer panels which will extend just above the top surface of the floor and this provides, together with a steel rod for passing through the rings, a convenient way to support and retain the form in place supported by the adjacent floor slabs on which the steel rods rest.

After the concrete is poured into the form, it may be levelled on the top surface by appropriate means and allowed to set to a firmness more than adequate to support its own weight with the aid of the reinforcing rod extending through the slab. At such time, the form may be removed by reversing the procedure outlined above and after sufficient time is allowed for the slab to gain full strength or nearly full strength, the repair by replacement of the slab will be complete. In practice it will generally be convenient to replace alternate ones of the floor slabs in a particular floor structure in one concrete pouring operation. Subsequently, the other set of alternate floor slabs can be replaced in one pouring operation and the entire floor slab will then have been reconditioned and repaired and ready for service life comparable to the original life of the floor slab.

It is an object of the present invention to provide apparatus and a method of using such apparatus to enable one to repair reinforced concrete slats in the floor of an animal pen by breaking away the concrete of a damaged slat while leaving any reinforcing bars within such slat and arranging a foldable three-part form to create a trapezoidal concrete form into which one pours a concrete mix and allows it to become firmly self-supporting before removing the form by lowering it to an unfolded position and drawing it up between two slat positions.

It is another object of the present invention to proceed to replace most or all of the slats of an animal pen floor slab by breaking out and reforming alternate ones of said slats in a first operation and subsequently, after those slats have become firm, performing the same procedure on the remaining set of alternate slats.

BRIEF DESCRIPTION OF THE DRAWINGS

Other objects and advantages of the present invention will become apparent by consideration of the following description in conjunction with the appended drawings in which:

FIG. 1 is a perspective view of a form according to the invention in use and a fragmentary showing of adjacent floor slats representing the environment of its use;

FIG. 2 is a plan view of the foldable form of FIG. 1 in flat position showing its hinged construction;

FIGS. 3-8 are schematic illustrations of the method of positioning the form of FIGS. 1 and 2 showing several steps in carrying out the method according to the invention.

DETAILED DESCRIPTION OF THE PREFERRED EMBODIMENTS

FIGS. 1 and 2 show a foldable form according to the invention which is useful in carrying out the process of the invention. Form 11 is characterized by a central panel 13 in the form of an elongated rectangle which has a length at least as great as the section of a slat to be repaired and a width approximately equal to the width of the bottom surface of the slat being replaced. A side panel 15 and a side panel 17 are secured to center panel 13 by hinges 19. While the illustrative embodiment of FIGS. 1 and 2 shows four conventional hinges, each about six inches in length and positioned near the end of center panel 13, more hinges of greater or lesser width could be employed or any piano hinge or other metal or plastic hinge mechanism could be employed to interconnect panels 13, 15 and 17 in a foldable manner.

Panels 13, 15, and 17 in the preferred embodiment are formed of steel plate of sufficient thickness to provide rigidity and may be of stainless steel or otherwise rendered resistant to rust or corrosion. Alternatively, panels 13, 15, and 17 may be formed of plastic, wood, or other material having sufficient rigidity to support the weight of itself and of the concrete which the forms contains without substantial deflection. The strength of the form in its folded position is greatly enhanced by the fact that it assumes the shape of a channel beam which is inherently strong and experiences little deflection under great weight.

Preferably panels 15 and 17 are provided with rings 21 on their outer edges which form a convenient method of supporting the form in proper position to receive the poured concrete. Correspondingly positioned rings 21 on panels 15 and 17 form a pair through which a rigid rod 23 or pin may be inserted to support the form in its folded or trapezoidal position. Rods 23 are preferably sufficiently long to overhang at least the adjacent slats in the animal pen floor so that no additional supporting structure is required for the form. Although this is the preferred manner of operation, the form could be supported from below or from above in any manner desired as long as at least part of the form was open to receive the poured concrete. Centrally placed rings 21 may also receive rods 23 to aid in support of the form 11, and they are especially useful in inserting and removing the form since a hook or similar tool may engage the form at one of the central rings 21 at a balance point for the form to enhance the convenience with which the form is emplaced and is removed.

Depending on the nature of the hinges 19, panels 13, 15 and 17 may be sufficiently closely spaced when the form is in its folded position to avoid any problem with loss of concrete through the joints between panels; alternatively, any form of adhesive tape, plastic film, or similar material may be placed over the joints between panels 13, 15, and 17 to virtually eliminate any loss of concrete through the joints.

Referring now to FIGS. 3-8, these are schematic illustrations helpful in understanding the method according to the invention. Each of the FIGURES shows a cross-sectional view taken in the direction of the longitudinal axis of a slat in the vicinity of the center of the slab or other portion of the slab which is to be reformed and replaced.

Normally the first step in the process would be to break and remove the concrete forming one of the slats leaving a central reinforcing bar 35. Preferably the concrete remaining at the end of the slat position is cleaned with muriatic acid or otherwise conditioned to maximize bonding between the old and the new concrete. FIG. 3 illustrates the situation after this has been done and after the form comprising panels 13, 15 and 17 has been lowered into the space between reinforcing bar 35 and an adjacent slat 31. Slat 31 also encloses a reinforcing bar 33, but it is not necessary or desirable that slat 31 be broken out at this time. As previously described, hinges 19 joining panels 15 and 17 to center panel 13 permit the form 11 to assume the flat vertical position shown in FIG. 3 simply by supporting the top of the panel 15 and allowing the effect of gravity to position the panels as shown in FIG. 3.

As shown in FIG. 4 the next step is to draw panel 17 up on the other side of reinforcing bar 35 so that the form 11 begins to assume the shape of three sides of a trapezoid. It may be convenient to use the center one of the rings 21 together with a hook or other tool to draw panel 17 up along the reinforcing bar 35.

FIG. 5 shows form 11 arranged and positioned with respect to reinforcing bar 35 so that a slab formed by pouring concrete in form 11 will have a cross section very nearly approximating that of the slat being replaced. It is preferable that the panels 15 and 17 have a width such that their slant height as shown in FIG. 5 is nearly equal to the depth of the slat being replaced. Rings 21 present only a slight impediment to using the top edges of panels 15 and 17 as a guide for levelling off the top of the slat to be formed.

FIG. 6 shows a preferred method and means for securing form 11 in place while it is filled with concrete. While rods 23 show a particularly convenient arrangement for supporting and positioning form 11, it is not critical to the invention, and any alternate method of supporting form 11 could be employed. As shown in FIG. 6 it will be seen that use of the rods 23 for supporting and positioning form 11 is best employed when the two slats adjacent to the one being reformed are still in place, even though they may be damaged and due for eventual replacement. In absence of slat 31 with central reinforcing bar 33 and slat 36 with central reinforcing bar 37 adjacent to the slat being reformed, then one may wish to employ a larger and stronger bridging structure than the rod 23 for bridging a greater distance across the animal pen floor slab to support form 11.

FIG. 7 shows the completion of the next step of pouring concrete 41 into form 11 around reinforcing bar 35 and leaving it to set to a firmness to be self-supporting, typically 12 hours or more.

The process is completed with respect to the slat 41 by essentially reversing the steps previously described as shown in FIG. 8 where rods 23 have been removed and where the form 11 has been displaced from the newly formed slat and is ready to be removed by drawing it up between slat 41 and slat 31.

Generally it will be desirable to replace many or all of the slats in an animal pen floor slab rather than just replacing one as described above. If more than a few (or if all) of the slats are to be replaced, then the most efficient procedure has been to break out, reform, and replace alternate ones of the slats, for example 1, 3, 5, 7, and 9, in one pouring of concrete and to return after a suitable time has expired for the concrete to set to remove the forms from the new slats 1, 3, 5, 7, and 9 and immediately break out the alternate slats, such as 2, 4, 6, and 8, and repeat the process with those slats.

In other cases where one decided to replace only two adjacent slats, it might be desirable to depart from the above procedure and utilize longer rods 23 to break out, reform and replace the two adjacent slats at the same time with both of the forms being supported by long supporting rods 23.

Other variations in the procedure are contemplated to accommodate special situations and it will be appreciated by those of ordinary skill in the art that numerous variations and modifications to the process described may be employed in addition to those described or suggested above. Accordingly, the scope of the invention should not be construed to be limited to those procedures specifically described but should be determined by reference to the appended claims.

Whereas, the present invention has been described in relation to the drawings attached hereto, it should be understood that other and further modifications, apart from those shown or suggested herein, may be made within the spirit and scope of this invention.

What is claimed is:

1. The method of repairing a reinforced concrete floor slab having a grating of slats integrally cast therein as found in animal pens using hinged panel concrete forms each having first side panel, bottom panel, and second side panel hingedly connected together comprising the steps of:
   (a) removing at least a substantial portion of a first slat having an internal reinforcement bar which it is desired to recast except for said internal reinforcement bar;
   (b) selecting a hinged panel concrete form of at least sufficient length to enclose the volume of said first slat which is to be recast;
   (c) lowering the selected form in an unfolded flat vertical configuration in the space between the position of said first slat and a first adjacent slat until the top of one of said side panels is near the level of the top of the slab;
   (d) lifting the bottom one of said side panels so that its free edge is near the level of the top of the slab and between the position of the slat to be recast and the second one of the slats adjacent thereto;
   (e) supporting said form with at least two transverse support members with said form positioned to enclose a volume having a trapezoidal cross-section narrower at the bottom than at the top and generally conforming to the cross-section of the slat being replaced;
   (f) repeating steps (a) through (e) for at least one other slat to be recast which is not an adjacent slat to a slat which has been partially removed;
   (g) pouring concrete in each of the hinged panel concrete forms and leaving the panels undisturbed until the concrete hardens;
   (h) removing all hinged panel forms by substantially reversing the process of steps (c), (d), and (e); and
   (i) repeating steps (a) through (h).

2. The method as recited in claim 1 wherein said side panels have rod accepting apertures and said transverse support members comprise rods having a length greater than the width of one of said slabs, said rods being employed by passing them through corresponding apertures on each of said side panels and resting the rods on adjacent slat top surfaces.

3. A method as recited in claim 1 wherein at least a small portion of each end of said slat which it is desired to recast is not broken away and further including the step of cleaning and conditioning the fragmented concrete surface at each such end to enhance the bonding between such surface and newly poured concrete forming the replacement slat.

4. The method as recited in claim 3 wherein cleaning and conditioning the fragmented concrete surface is at least in part achieved by application of muriatic acid thereto.

5. The method of repairing a reinforced concrete floor slab having an array of slats integrally cast therein as found in animal pens using foldable concrete forms each having first side panel, bottom panel, and second side panel connected together comprising the steps of:
   (a) removing concrete forming at least a substantial portion of a slat which it is desired to recast;
   (b) selecting a foldable concrete form of at least sufficient length to enclose the volume of said slat which is to be recast;
   (c) lowering the selected form with its panels in an unfolded vertical configuration into the space between the position of said slat and an adjacent slat until the top one of said side panels is near the level of the top of the slab;
   (d) lifting the bottom one of said panels so that its free edge is near the level of the top surface of the slab spaced from said top one of said side panels by the width of one of said slats;
   (e) supporting said form with at least two transverse support members with said form positioned to enclose a volume having a trapezoidal cross-section narrower at the bottom than at the top; and
   (f) pouring concrete in said foldable concrete form and leaving the panels undisturbed until the concrete hardens.

6. The method as recited in claim 5 wherein said side panels have rod accepting apertures and said transverse support members comprise rods having a length greater than the width of one of said slabs, said rods being employed by passing them through corresponding apertures on each of said side panels and resting the rods on adjacent slat top surfaces.

7. A method as recited in claim 5 wherein at least a small portion of each end of said slat which it is desired to recast is not broken away and further including a step of cleaning and conditioning the fragmented concrete surface at each such end to enhance the bonding between such surface and newly poured concrete forming the replacement slat.

8. The method as recited in claim 7 wherein cleaning and conditioning the fragmented concrete surface is at least in part achieved by application of muriatic acid thereto.

9. The method as recited in claim 5 further including the step of removing said foldable concrete form by substantially reversing the process of steps (c), (d), and (e).

10. The method as recited in claim 9 wherein said side panels have rod accepting apertures and said transverse support members comprise rods having a length greater than the width of one of said slabs, said rods being employed by passing them through corresponding apertures on each of said side panels and resting the rods on adjacent slat top surfaces.

11. A method as recited in claim 9 wherein at least a small portion of each end of said slat which it is desired to recast is not broken away and further including a step of cleaning and conditioning the fragmented concrete surface at each such end to enhance the bonding between such surface and newly poured concrete forming the replacement slat.

12. The method as recited in claim 11 wherein cleaning and conditioning the fragmented concrete surface is at least in part achieved by application of muriatic acid thereto.

13. The method of repairing a reinforced concrete floor slab having a grating of slats integrally cast therein as found in animal pens using hinged panel concrete forms each having first side panel, bottom panel, and second side panel hingedly connected together comprising the steps of:

(a) removing at least a substantial portion of a first slat which it is desired to recast;

(b) lowering a selected form in an unfolded flat vertical configuration adjacent the position of said first slat;

(c) lifting the bottom one of said side panels so that its free edge is near the level of the top of the slab;

(d) supporting said form positioned to enclose a volume having a trapezoidal cross-section narrower at the bottom than at the top and generally conforming to the cross-section of the slat being replaced; and (e) pouring concrete in said concrete form and leaving the panels undisturbed until the concrete hardens.

14. A method as recited in claim 13 wherein at least a small portion of each end of said slat which it is desired to recast is not broken away and further including the step of cleaning and conditioning the fragmented concrete surface at each such end to enhance the bonding between such surface and newly poured concrete forming the replacement slat.

15. The method as recited in claim 14 wherein cleaning and conditioning the fragmented concrete surface is at least in part achieved by application of muriatic acid thereto.

* * * * *